US005204529A

United States Patent [19]

Diatschenko

[11] Patent Number: 5,204,529
[45] Date of Patent: Apr. 20, 1993

[54] METHOD AND APPARATUS FOR MEASURING BOREHOLE FLUID DENSITY, FORMATION DENSITY AND/OR BOREHOLE DIAMETER USING BACK-SCATTERED GAMMA RADIATION

[75] Inventor: Victor Diatschenko, Houston, Tex.

[73] Assignee: Texaco Inc., White Plains, N.Y.

[21] Appl. No.: 642,933

[22] Filed: Jan. 18, 1991

[51] Int. Cl.⁵ .............................................. G01V 5/12
[52] U.S. Cl. ................................... 250/268; 250/269; 250/266
[58] Field of Search ............... 250/269, 262, 264, 265, 250/266, 268

[56] References Cited

U.S. PATENT DOCUMENTS

| | | | |
|---|---|---|---|
| 3,662,172 | 5/1972 | Youmans | 250/268 |
| 3,976,879 | 8/1976 | Turcotte | 250/269 |
| 4,661,700 | 4/1987 | Holenka | 250/269 |
| 4,939,362 | 7/1990 | Supernaw et al. | 250/269 |
| 4,958,073 | 9/1990 | Becker et al. | 250/269 |

Primary Examiner—Carolyn E. Fields
Assistant Examiner—Drew A. Dunn
Attorney, Agent, or Firm—Jack H. Park; Kenneth R. Priem; Russell J. Egan

[57] ABSTRACT

The present invention is a formation compensated fluid density meter which includes a well logging sonde that is inserted into a borehole traversing an earthen formation. The sonde includes within it a source which emits gamma rays into the borehole fluid and formation partially collimated and detector assemblies which detect returning gamma rays and provide count signals corresponding to a count of the detected gamma rays. A cable connected to the detector assembly conveys the count signals to the surface where surface electronics includes apparatus which processes the count signals to provide a signal corresponding to the density of the fluid in the borehole.

10 Claims, 2 Drawing Sheets

METHOD AND APPARATUS FOR MEASURING BOREHOLE FLUID DENSITY, FORMATION DENSITY AND/OR BOREHOLE DIAMETER USING BACK-SCATTERED GAMMA RADIATION

BACKGROUND OF THE INVENTION

1. Field of the Invention

The present invention relates to well logging means and methods in general and, more particularly, to a well logging means and method for determining the density of a fluid in the borehole, formation density and borehole diameter using back-scattered gamma radiation.

2. The Prior Art

The prior art is best represented by U.S. Pat. No. 4,939,362 issued Jul. 3, 1990, and assigned to a common assignee. The invention described in this patent is a density meter in the form of a sonde adapted to be inserted into a borehole. The sonde includes a gamma ray source and a detector assembly for detecting the back-scattered gamma rays and provide a signal corresponding to the counted rays. Caliper means on the sonde continually measure the diameter of the borehole as the sonde passes therethrough and provides a caliper signal corresponding to the diameter. The count signals and caliper signals are sent to the surface for processing to generate an output signal corresponding to the density of the fluid in the borehole.

Supernaw et al recognized that the gamma rays are Compton scattered in the fluid and formation. The detector assemblies cannot determine where the scattering occurs and simply register the reception of a gamma ray. The count rate is determined by the number of these gamma rays observed during a specific time interval. If this count rate is used to calculate the density, the result will reflect a density that is a combination of the fluids in the borehole and the formation, and consequently be erroneous, due to the fact that the formation contribution is significant and dependent on the fluid densities, the borehole diameter, as well as the formation density. To obtain the correct density of the borehole fluids, it is necessary to account for the formation. Supernaw et al do not consider nor provide a means to remove or correct for the contribution of the formation.

SUMMARY OF THE INVENTION

The present invention is a density meter which includes a well logging sonde that is inserted into a borehole traversing an earthen formation. The sonde includes within it a partially collimated source which emits gamma rays into the borehole fluid and at least one detector assembly spaced from and directly shielded from the source. The additional shield is to insure that the detector is not directly irradiated by the source. Each detector assembly detects gamma rays scattered from the borehole fluid and formation and provides a count signal corresponding to a count of the detected gamma rays. A cable connected to the detector assembly and to the caliper conveys the count and diameter signals to the surface where surface electronics includes apparatus which processes the count and diameter signals to provide a signal corresponding to the density of the fluid in the borehole.

BRIEF DESCRIPTION OF THE DRAWINGS

The present invention will now be described, by way of example, with reference to the accompanying drawings in which.

DESCRIPTION OF THE INVENTION

In production logging, a common procedure is the measurement of the profile of the oil and water flow rates at depth in the well. These rates are estimated from the determinations of water holdup and total flow rate. The estimate of the water holdup is in turn derived from an assessment of the density of the fluid in the borehole. Therefore, the determination of the average density of the borehole fluid greatly affects the accuracy of results of the water flow calculation.

There is evidence which indicates that at least in large diameter boreholes in regions where oil is entering the borehole where water is flowing, there exists a density gradient across the borehole with the lighter (oil rich) portion near the formation wall and the heavier (water rich) fraction in the center. This situation presents a problem because all the tools used to make the density determination in production logging do so with a small tool (1 11/16 inch diameter) centralized in the borehole. Whether these tools measure the density by gamma ray attenuation of a well collimated source in a centralized sample chamber or by pressure differential (the two commonly employed methods), they will suffer the limitation that they do not sense the true average density of the fluid in question but give a high estimation thereof. This becomes a severe problem in large boreholes (6–7 inch diameter).

Figure 1:
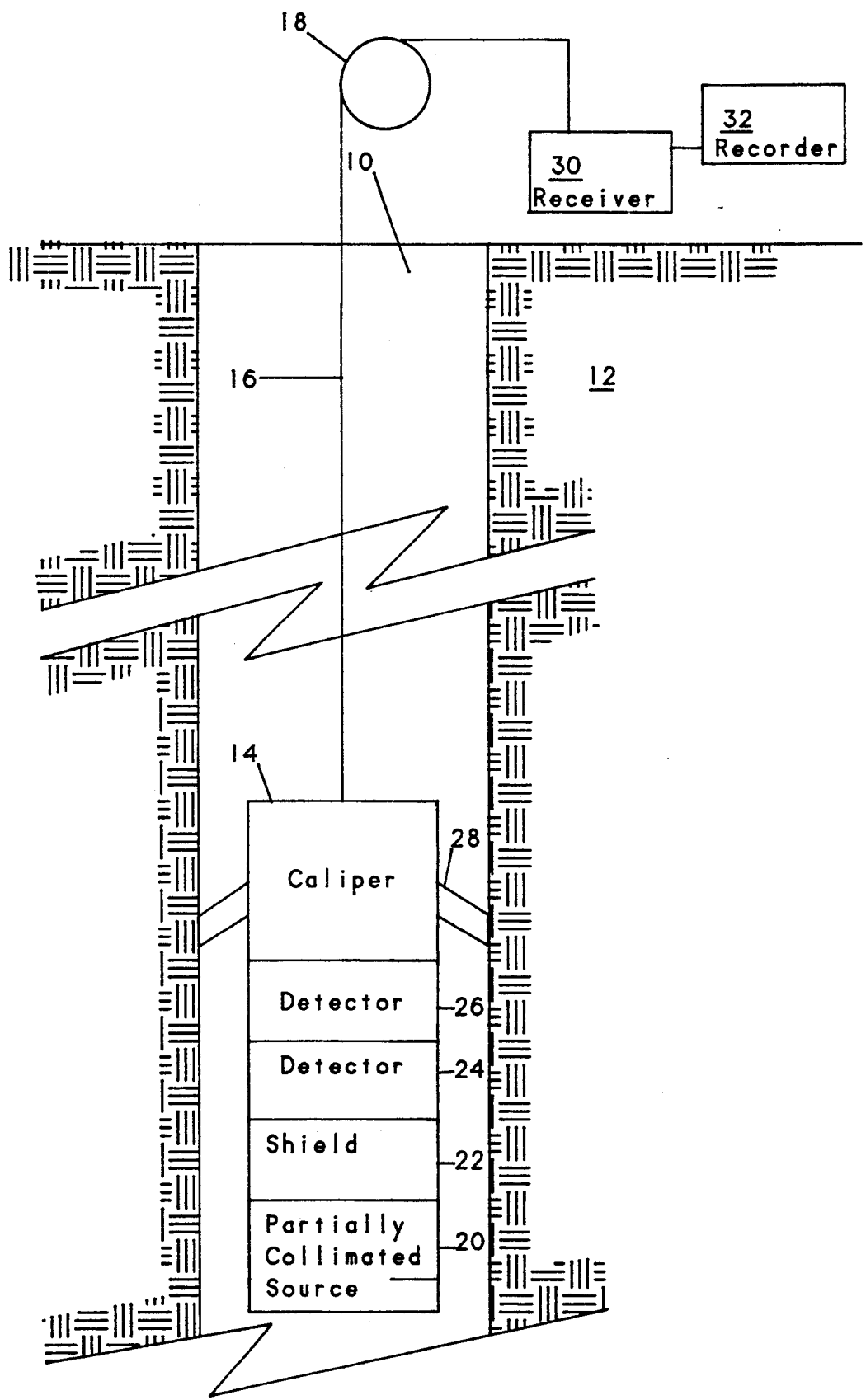
FIG. 1 is a diagrammatic representation of a well logging system constructed in accordance with the present invention having two detector assemblies.

With reference to FIG. 1, borehole 10 traverses earthen formation 12 and is partially filled with a still or flowing fluid (not shown) which is a combination of oil and water in various concentrations. A sonde 14 is suspended in the fluid filled borehole by a conventional logging cable 16 from a surface mounted shreave wheel 18. Shreave wheel 18 provides a signal corresponding to the depth of sonde 14 in the borehole 10.

Sonde 14 is an elongated generally tubular member and includes at one end a nuclear source 20 which emits gamma radiation. Nuclear source 20 may be any well-known source, such as $^{137}$Cs. partially collimated gamma radiation is radiated from the sonde at approximately 45°. Additionally, a shield 22 is fixed transversely within the sonde to further prevent any radiation from traveling inside the length of sonde 14.

On the opposite side of shield 22 from the source 20 are detector assemblies 24,26 which are conventional gamma ray detector assemblies and as such would include a scintillation crystal which provides a light pulse in response to detected gamma radiation. The light pulses are converted to electrical pulses by known means, such as photomultiplier tubes. All of this structure within detector assemblies 24,26 is well-known in the art and therefore has not been illustrated. It should suffice to say that detector assemblies in 24,26 provide signals corresponding to a count rate of the gamma rays detected thereby.

As noted above, shield 22 absorbs those gamma rays travelling longitudinally within sonde 14, but the remaining partially collimated gamma rays emitted by source 20 escape into the fluid and undergo Compton scattering in the fluid and formation and find their way to detector assemblies 24,26. Thus any gamma ray entering detector assemblies in 24,26 has passed through a path length of the fluid and formation which will allow it to be influenced by the total mass of the fluid in the borehole and formation.

It follows that knowing the proximity of the formation from a signal provided by caliper means 28, that the effect of the observed count rate is related to the average density of the fluid in borehole 10, since a denser fluid would absorb a greater fraction of the scattered photons. Detector assemblies 24,26 may each include counter means or they could transmit the pulses from their respective photomultiplier tubes directly uphole where, along with the signal from caliper means, the signals can be used to determine the density.

The signals can be transmitted by way of a conventional type well logging cable 16 to surface data processing equipment 30 of known configuration.

It will be clear to one skilled in the art that the necessary detailed elements for applying signals to well logging cables are well known in the art and it would add nothing to the disclosure of the present invention to discuss them at this time. Similarly, the pick-off circuits are known in the art for picking off the signals from cable 16 and providing them to elements of surface equipment 30. Surface equipment 30 includes means for receiving the signal from the shreave wheel and the signals from the detectors via cable means and determines the density of the fluid at a specified depth in the borehole.

Process means 30 determines the density $\rho_B$ of the borehole fluid in accordance with the following equation $$\rho_B = 1/A_3(A_{2j}(D_B-D_T) - A_4\rho_F - \ln(C_j/A_{1j})) \quad (1)$$

where $D_B$=Borehole diameter, $D_T$=Tool diameter, $\rho_B$=Borehole fluid density, $\rho_F$=Formation density, $C_j$ absolute=Counting rate at $j^{th}$ detector, $A_{ij}$ Defector Specific=Tool constants determined from calibration.

Process means 30 provides an average density signal to record means 32. Record means 32 also receives the shreave wheel signal so that the density signal is correlated to depth in the borehole.

Figure 2:
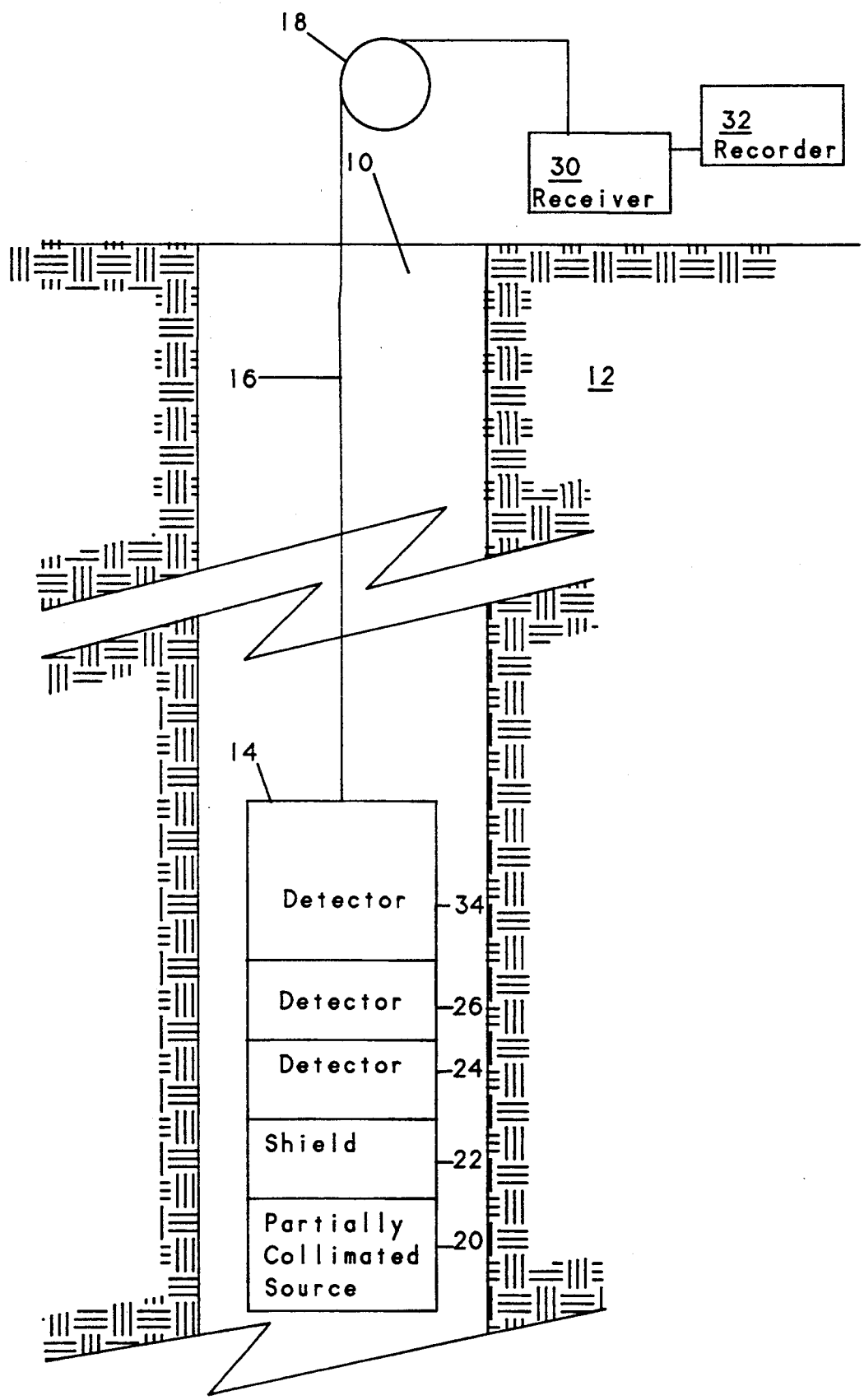
FIG. 2 is a diagrammatic representation of a three detector embodiment.

The present invention uses the multi-detector system shown in FIGS. 1 and 2. The additional detectors were included as a means of correcting for formation effects. This allows a measurement of the borehole fluid density that is independent of the formation. The consequence is a logging sonde that has applications in production logging as well as other areas that require knowledge of fluid, formation densities and borehole diameters.

Equation 1 explicitly indicates how to estimate the true density of the fluid in the borehole while correcting for formation effects as well as borehole size variations. Equation 1 can be used with a single detector, provided that a caliper is used to determine the borehole diameter and the formation density is known. The latter information is usually available in a producing well in the form of formation matrix densities, porosity, and estimates of fluid densities contained in the formation. However, if this data contains errors, then the resultant calculation of the borehole fluid density will be in error. The use of two detectors, which are individually described by Equation 1, eliminates this difficulty. Surface/subsurface processing of the data reduces to a simultaneous solution of two equations.

The present invention further contemplates use of three detectors (FIG. 2) to obtain all three relevant parameters. That is the borehole fluid density, the borehole diameter, and the effective formation density. This again is an improvement since the third detector assembly 34 replaces and eliminates the need of caliper 28. The consequence is a further generalization in the applicability of the logging tool as well as making it a stand alone instrument. The data manipulation reduces to simple matrix manipulation.

The present invention constitutes an improvement over the prior art by:

1. A specific relationship that relates the observed counting rates to a single borehole fluid density while correcting for borehole size effects as well as the formation.
2. The addition of the second detector to provide a fluid density measurement that is independent of the formation density.
3. The addition of a third detector to eliminate the need for a separate mechanical borehole diameter measurement.
4. Since a similar equation describes each detector, data processing reduces to simple matrix manipulation and can be performed trivially by a single processing chip mounted on board the sonde.

A generalized embodiment of the present invention, comprising either a two detector system with calipers of a multi-detector system without calipers, has several benefits and possible downhole application. In open hole completions, the removal of the caliper would reduce the possibility of the tool getting stuck downhole. Multiple detectors would simplify evaluations of gravel packs in that the current requirement for multiple passes would be obviated. Cased hole completions can also benefit by the ability of the present invention to simultaneously obtain fluid density while performing casing evaluations.

The centralized instrument of the present invention that is able to investigate the entire borehole and surrounding formation is useful for density measurements in highly deviated and/or horizontal wells with cased and/or open hole completions.

There may be further application for the present invention in the area of steam quality measurements.

The present invention may be subject to many modifications and changes without departing from the spirit or essential characteristics of the present invention. The above discussed embodiments are therefore to be considered in all respects as illustrative and not restrictive of the scope of the invention as defined by the appended claims.

What is claimed is:

1. A well logging system which measures the formation compensated density of a fluid in a borehole traversing an earthen formation, comprising:
    sonde means including:
        source means for partially collimated emitting gamma rays into the borehole fluid;
        at least two detector means for detecting gamma rays from the borehole fluid and providing a count rate signal corresponding to a count rate of the detected gamma rays;
        means continually measuring borehole diameter and means for providing caliper signals;

shield means fixed within said sonde between said source means and said at least two detector means preventing direct detection of gamma rays from said source means by said at least two detector means;

cable means connected to the at least two detector means for conveying the count rate signal to the surface, and surface electronics including:

processing means connected to the cable means for processing the count rate signals and the caliper signals to provide a density signal corresponding to the density of the fluid in the borehole.

2. A system as described in claim 1 in which the surface electronics further comprises:

depth measuring means cooperating with the cable means for providing a signal corresponding to the depth of the sonde means in the borehole, and means connected to said depth measuring means and to the processing means for recording the density signal in correlation to the depth of the sonde means.

3. A system as described in claim 2 in which the processing means includes:

means for providing the density signal in accordance with the caliper signal, the count rate signals and the following equation $$\rho_B = 1/A_{3j}(A_2(D_B-D_T) - A_4\rho_F - \ln(C_j/A_{1j}))$$

where $\rho_B$ is the density of the fluid, $\rho_F$ represents the formation of density, $C_j$ is the absolute count rate of the detected gamma rays, $D_B$ is the borehole diameter determined from the caliper signal; $D_T$ is the tool diameter, and $A_{ij}$ are calibration constants.

4. The well logging system according to claim 1 wherein said means continually measuring borehole diameter is another detector means.

5. The well logging system according to claim 1 wherein said means continually measuring borehole diameter is a caliper means.

6. A well logging method which measures the density of a fluid in a borehole traversing an earthen formation, comprising:

emitting partially collimated gamma rays into the borehole fluid from a source located in a well logging sonde, detecting gamma rays from the borehole fluid with at least two detectors located in the well logging sonde, preventing direct detection of gamma rays from said source by said detectors, providing a count rate signal corresponding to a count rate of the detected gamma rays, continually measuring the diameter of the borehole and providing a caliper signal, conveying the count rate signal to the surface with a cable, and processing the count rate signal and the caliper signal at the surface to provide a density signal corresponding to the density of the fluid in the borehole.

7. A method as described in claim 6 further comprising the steps of:

providing a signal corresponding to the depth of the sonde in the borehole, and recording the density signal in correlation to the depth of the sonde.

8. A method as described in claim 7 in which the processing step includes:

providing the density signal in accordance with the caliper signal, the count rate signals and the following equation $$\rho_B = 1/A_{3j}(A_2(D_B-D_T) - A_4\rho_F - \ln(C_j/A_{1j}))$$

where $\rho_B$ is the density of the fluid, $\rho_F$ represents the formation density, $C_j$ is the absolute count rate of the detected gamma rays, $D_B$ is the borehole diameter determined from the caliper signal; $D_T$ is the tool diameter, and $A_{ij}$ are calibration constants.

9. A method as described in claim 6 wherein said diameter of the borehole is measured by caliper means.

10. A method as described in claim 6 wherein said diameter of the borehole is measured, by a further detector assembly.

* * * * *